United States Patent [19]

Godfrin

[11] Patent Number: 5,011,863

[45] Date of Patent: Apr. 30, 1991

[54] PROCESS FOR THE PREPARATION OF EXPANDABLE POLYMER BEADS AND MATERIALS DERIVED THEREFROM

[75] Inventor: Hugues Godfrin, Vimy, France

[73] Assignee: Atochem, Paris La Defense, France

[21] Appl. No.: 553,815

[22] Filed: Jul. 19, 1990

[30] Foreign Application Priority Data

Jul. 19, 1989 [FR] France .................................. 89 09704

[51] Int. Cl.$^5$ ................................................ C08J 9/20
[52] U.S. Cl. ........................................ 521/56; 521/57; 521/59; 521/60; 521/146
[58] Field of Search ...................... 521/56, 57, 60, 59

[56] References Cited

U.S. PATENT DOCUMENTS

| | | | |
|---|---|---|---|
| 3,060,138 | 10/1962 | Wright | 521/60 |
| 3,224,984 | 12/1965 | Roper | 521/92 |
| 3,285,865 | 11/1966 | NelBene et al. | 521/139 |
| 3,320,188 | 5/1967 | Dijkema | 521/97 |
| 3,520,834 | 7/1970 | Mizutani et al. | 521/134 |
| 3,647,723 | 3/1972 | Mysik | 521/98 |
| 4,243,717 | 1/1981 | Gahring | 521/60 |
| 4,761,432 | 8/1988 | Sonnenberg et al. | 521/60 |

FOREIGN PATENT DOCUMENTS

| | | |
|---|---|---|
| 3347279 | 7/1985 | Fed. Rep. of Germany . |
| 49066785 | 6/1974 | Japan . |
| 2110217 | 6/1983 | United Kingdom . |

*Primary Examiner*—Morton Foelak
*Attorney, Agent, or Firm*—Millen, White & Zelano

[57] ABSTRACT

The polymerization in aqueous suspension of at least one vinylaromatic monomer is carried out in the presence, relative to the vinylaromatic monomer, of approximately 0.01% to 0.6% by weight of at least one polyethylene wax and of approximately 0.005% to 0.1% by weight of at least one nonionic surface-active agent which has an HLB value of between 7 and 16.

Materials obtained from expandable beads prepared according to this polymerization process.

12 Claims, No Drawings

PROCESS FOR THE PREPARATION OF EXPANDABLE POLYMER BEADS AND MATERIALS DERIVED THEREFROM

The present invention relates to a process for the preparation of expandable polymer beads and to the materials obtained from the said beads.

Expanded polystyrene panels obtained by moulding heated expandable or preexpanded polystyrene beads are known for their low coefficient of thermal conductivity and are consequently very widely employed in thermal insulation. Other articles made of expanded polystyrene are also employed very extensively as wedging materials in the packaging industry.

In order to increase the production efficiency of expanded polystyrene moulding plants attempts have been made to find additives which permit a higher moulding rate while preserving the low thermal conductivity coefficient of the materials obtained. The main obstacle which is encountered when attempts are made to increase the rate is the lengthening of the cooling time of the moulded articles.

A combination of additives has now been found which makes it possible to shorten very considerably the cooling time of the moulded articles made of expanded polystyrene while having no untoward effect on their thermal conductivity.

The present invention relates to a process for the preparation of expandable polymer beads comprising (a) the polymerization in aqueous suspension, at a temperature of approximately between 80° C. and 150° C., at a pressure of approximately between 1 and 20 bars, for a period of approximately between 6 and 20 hours, of at least one vinylaromatic monomer in the presence of an effective quantity of at least one polymerization initiator and an effective quantity of at least one suspension stabilizer, and (b) the addition of an effective quantity of at least one blowing agent, characterized in that it consists in performing the polymerization in the presence, in relation to the vinylaromatic monomer(s), of approximately 0.01% to 0.6% by weight of at least one polyethylene wax and of approximately 0.005% to 0.1% by weight of at least one nonionic surface-active agent which has an HLB (hydrophile-lipophile balance) of approximately 7 and 16.

A vinylaromatic monomer according to the invention is intended to mean styrene and its higher homologues such as especially vinyltoluenes and alpha-methylstyrene.

The polymerization initiator employed may be a peroxide such as benzoyl or cumyl peroxide, di-tert-butyl peroxide, 2,5-dimethyl-2,5-di-tert-butylperoxy-3-hexyne, a perester such as tert-butyl perbenzoate, a hydroperoxide such as tert-butyl hydroperoxide, or a diazo derivative such as 2,2'-azobisisobutyronitrile. The initiator is preferably employed in a quantity of at least 1% by weight relative to the vinylaromatic monomer.

The suspension stabilizer acts as a protective colloid to prevent the coagulation of the particles of polymer formed. It may be a water-soluble polymer such as polyvinyl alcohol or a water-insoluble inorganic compound such as a tricalcium phosphate like hydroxyapatite. In this latter case at least one costabilizer such as, for example, an alkali metal persulphate is coupled with the suspension stabilizer in a quantity which is preferably less than 30 ppm relative to the vinylaromatic monomer. The quantity of suspension stabilizer which is generally employed is not more than 1% by weight relative to the vinylaromatic monomer.

The weight ratio of water to the vinylaromatic monomer in the suspension is advantageously between 0.3 and 1.5, preferably close to 1.

The blowing agent added to the reaction mixture during or after the polymerization is preferably chosen from saturated hydrocarbons such as butane, pentane, hexane, cyclopentane, halogenated hydrocarbons such as dichlorodifluoromethane, chlorotrifluoromethane or methylchloride. The quantity of blowing agent which is employed is generally smaller than 10% by weight relative to the vinylaromatic monomer.

A polyethylene wax according to the invention is intended to mean an ethylene polymer or copolymer which has at least one of the following three properties:
- number-average molecular mass, measured by gel permeation chromatography, of approximately between 500 and 5,000,
- softening point of approximately between 90° and 110° C.,
- melt index, measured according to ASTM standard D 1238 condition E, which is higher than 100 dg/min, preferably approximately between 200 and 2,000 dg/min.

An ethylene copolymer is intended to mean the product resulting from the copolymerization of ethylene either with at least one alpha-olefin containing from 3 to 12 carbon atoms or with at least one ethylenically unsaturated monomer bearing at least one functional group, such as acrylic acid, methacrylic acid, alkyl(meth)acrylates in which the alkyl radical contains from 1 to 8 carbon atoms, maleic anhydride and vinyl acetate.

The quantity of polyethylene wax which is employed during the polymerization is advantageously between 0.05% and 0.4% by weight relative to the vinylaromatic monomer, preferably between 0.1 and 0.3% by weight.

A nonionic surface-active agent according to the present invention is intended to mean a compound chosen from polyoxyethylenated derivatives of (alkyl)phenols, polyoxyethylenated derivatives of alcohols containing at least 12 carbon atoms, polyoxyethylenated derivatives of organic acids containing at least 12 carbon atoms, esters of an organic acid containing at least 12 carbon atoms and polyoxyethylene sorbitol.

A polyoxyethylenated derivative of an alkylphenol, preferably of a dialkylphenol, in which the alkyl radical contains from 4 to 12, preferably 8 or 9, carbon atoms, is advantageously employed. The number of ethylene oxide chain links per molecule is advantageously between 5 and 50.

The quantity of nonionic surface-active agent employed during the polymerization is advantageously between 0.01% and 0.05% by weight relative to the vinylaromatic monomer, preferably between 0.02 and 0.04% by weight.

The polymerization can also be carried out in the presence of at least one chain transfer agent such as a mercaptan or alpha-methylstyrene dimer, if it is desired to limit the molecular mass of the expandable polymer formed, or else in the presence of at least one ethylenically unsaturated compound acting as a crosslinker, such as divinylbenzene or triallyl cyanurate.

For the purpose of obtaining flame-resistant materials, the polymerization can also be performed in the presence of at least one flame-retardant agent chosen especially from bromine compounds such as hexabromocyclohexane, pentabromomonochlorocyclohexane, hexabromocyclododecane, octa-, nona- and decabromodiphenyl and octa-, nona- and decabromodiphenyl ether. A quantity of flame-retardant agent which is preferably close to approximately 0.1 to 2% by weight relative to the vinylaromatic monomer is employed.

After polymerization, acidification of the reaction mixture to a pH close to 2 and addition of the blowing agent, the beads obtained are washed with water, centrifuged, dried in a stream of air (at a temperature which is generally between 25° C. and 55° C.) and are then screened. Their blowing agent content is generally close to 5 to 8% by weight. Their apparent density is generally close to 600 to 700 kg/m³.

The beads can then be converted into preexpanded beads by the action of, for example, steam for a sufficient time to reach the predetermined apparent density which may be, for example, between 7 and 100 kg/m³. The preexpanded beads can be converted into moulded articles by being introduced into a mould which is not gastight and which is heated to a temperature above the boiling point of the blowing agent for the time needed for the beads to adopt the internal shape of the mould. After cooling, the article obtained is demoulded. The mould may either be filled completely with preexpanded beads and, in this case, the density of the moulded article obtained will be approximately the same as that of the preexpanded beads, or may be filled incompletely and, in this case, the moulded article will have a lower density.

The present invention also relates to the materials obtained from expandable beads prepared according to the process described above and containing approximately from 0.01% to 0.6% by weight of at least one polyethylene wax such as defined above and approximately from 0.005% to 0.01% by weight of at least one nonionic surface-active agent which has an HLB value of approximately between 7 and 16.

These materials may be preexpanded beads, expanded moulded articles of any geometrical shapes and of any volume.

The following examples are intended to illustrate the invention without any limitation being implied. The parts are expressed by weight, unless indicated otherwise.

EXAMPLE 1 (comparative)

Into a reactor fitted with means of stirring, heating and cooling, are introduced in succession: 100 parts of water, 0.17 parts of hydroxyapatite, 0.2 parts of polyethylene wax 6 A marketed by Allied Chemicals, 100 parts of styrene, 0.5 parts of liquid paraffin, 0.296 parts of benzoyl peroxide, 0.11 parts of alpha-methylstyrene dimer and 0.15 parts of di-tert-butyl peroxide. 0.001 parts of potassium persulphate in all are added to the reaction mixture in a proportion of 1/5 at the beginning of reaction and 4/5 after 5 hours at 90° C. The reaction mixture is heated to 90° C. for 3.5 hours and 0.19 parts of hydroxyapatite are added; it is kept at 90° C. for another 2.5 hours and then, after the addition of 8 parts of n-pentane, it is heated to 130° C. for one hour. After cooling the reaction mixture, the pH of the aqueous phase is brought to a value close to 2 by adding HCl. The expandable beads obtained are washed with water, centrifuged, dried in a stream of air and are screened and then preexpanded until a density of 15 g/l is obtained.

A steel block mould, which is not gastight, is filled completely with preexpanded beads. After closure, the mould is heated with steam to a temperature close to 110° C. for 20 seconds. The time taken by the moulded block for the pressure exerted on the wall of the mould to drop to 1.15 bars is then measured. By definition, this time is called the cooling time (CT). A period of 38 minutes is observed.

EXAMPLE 2 (comparative)

The operating procedure of Example 1 is repeated in all respects, except that the polyethylene wax is replaced with 0.03 parts of ethoxylated dinonylphenol marketed under the name Sinnopal DNP 10, introduced just before the addition of the blowing agent.

The cooling time is 27 minutes.

EXAMPLE 3

The two additives employed separately in Examples 1 and 2 are coupled in the same quantities employed in the said examples respectively, according to the same operating procedure.

The cooling time is 15 minutes.

The preceding examples can be repeated with similar success by substituting the generically or specifically described reactants and/or operating conditions of this invention for those used in the preceding examples.

The entire disclosure of French 89 09704, filed July 19, 1989, is hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the preparation of expandable polymer beads comprising (a) the polymerization in aqueous suspension, at a temperature of between 80° C. and 150° C., at a pressure of between 1 and 20 bars, for a period of between 6 and 20 hours, of at least one vinylaromatic monomer in the presence of an effective quantity of at least one polymerization initiator and of an effective quantity of at least one suspension stabilizer, and (b) the addition of an effective quantity of at least one blowing agent, the improvement which comprises performing the polymerization in the presence, in relation to the vinylaromatic monomer(s), of 0.01% to 0.6% by weight of at least one polyethylene wax and of 0.005% to 0.1% by weight of at least one nonionic surface-active agent having an HLB (hydrophile-lipophile balance) value of between 7 and 16.

2. A process according to claim 1, wherein the polyethylene wax exhibits at least one of the following three properties:
   (a) number-average molecular mass, measured by gel permeation chromatography, of between 500 and 5,000,
   (b) softening point of between 90° and 110° C., and
   (c) melt index, measured according to ASTM standard D 1238 condition E, higher than 100 dg/min.

3. A process according to claim 1, wherein the nonionic surface-active agent is a polyoxyethylenated alkylphenol, a polyoxyethlenated alcohol containing at least 12 carbon atoms, a polyoxyethylenated organic acid containing at least 12 carbon atoms, an ester of an organic acid containing at least 12 carbon atoms, and polyoxyethylene sorbitol.

4. A process according to claim 2, wherein the nonionic surface-active agent is a polyoxyethylenated alkylphenol, a polyoxyethlenated alcohol containing at least 12 carbon atoms, a polyoxyethylenated organic acid containing at least 12 carbon atoms, an ester of an organic acid containing at least 12 carbon atoms, and polyoxyethylene sorbitol.

5. A process according to claim 3, wherein the polyoxyethylenated alkylphenol is polyoxyethylenated dinonylphenol.

6. A process according to claim 4, wherein the polyoxyethylenated alkylphenol is polyoxyethylenated dinonylphenol.

7. A process according to claim 1, wherein the polymerization is carried out in the presence of at least one flame-retardant agent in a quantity of between 0.1 and 2% by weight relative to the vinylaromatic monomer.

8. A material obtained from expandable polymer beads prepared according to the process of claim 1, said materials permitting the use of low cooling times in a process of molding said materials.

9. A material according to claim 8, being preexpanded beads.

10. A material according to claim 8, being molded articles.

11. A material obtained from expandable polymer beads prepared according to the process of claim 6, said materials permitting the use of low cooling times in a process of molding said materials.

12. A material according to claim 11, being preexpanded beads.

* * * * *